(12) United States Patent
Yan (10) Patent No.: US 7,614,115 B2
(45) Date of Patent: Nov. 10, 2009

(54) WHEEL STRUCTURE WITH A CENTRAL CONTROL

(76) Inventor: Li-Lan Yan, No. 36-1, Siaokang Lane, Puzih City, Chiayi County (TW)

( * ) Notice: Subject to any disclaimer, the term of this patent is extended or adjusted under 35 U.S.C. 154(b) by 293 days.

(21) Appl. No.: 11/882,128

(22) Filed: Jul. 31, 2007

(65) Prior Publication Data
US 2009/0031533 A1 Feb. 5, 2009

(51) Int. Cl.
*B60B 33/00* (2006.01)
(52) U.S. Cl. ........................................ 16/35 R; 16/18 R
(58) Field of Classification Search ................ 16/35 R, 16/35 D, 43, 20, 18 R, 37; 188/1.12
See application file for complete search history.

(56) References Cited

U.S. PATENT DOCUMENTS

| | | | | |
|---|---|---|---|---|
| 4,677,706 A | * | 7/1987 | Screen | 16/35 R |
| 4,722,114 A | * | 2/1988 | Neumann | 16/35 R |
| 4,815,161 A | * | 3/1989 | Timmer et al. | 16/35 R |
| 5,774,936 A | * | 7/1998 | Vetter | 16/35 R |
| 6,584,641 B1 | * | 7/2003 | Milbredt | 16/35 R |
| 6,865,775 B2 | * | 3/2005 | Ganance | 16/35 R |
| 7,200,894 B2 | * | 4/2007 | Block et al. | 16/18 R |
| 2004/0068831 A1 | * | 4/2004 | Caruso et al. | 16/18 R |
| 2004/0117943 A1 | * | 6/2004 | Block et al. | 16/18 R |

* cited by examiner

*Primary Examiner*—Victor Batson
*Assistant Examiner*—Jeffrey O'Brien
(74) *Attorney, Agent, or Firm*—Rosenberg, Klein & Lee (57) ABSTRACT

A wheel structure includes a central sleeve, a central controlling shaft joined to the central shaft, a wheel pivoting on an extension portion of the central shaft, and a braking unit; the central controlling shaft includes a controlling piece, and a connecting part for controlling the controlling piece; a position-limiting element is secured in the central sleeve, which is next to the controlling piece, and has a position-limiting hole having the same outline as the controlling piece; the braking unit is arranged in the central sleeve in a movable manner, and biased upwards by springs; the central controlling shaft is operable to change the wheel into first, second, and third configurations; in the first configuration, the wheel can move and turn left and right freely; in the second one, the wheel can only move in a direct course; in the third one, the wheel is immobile.

5 Claims, 10 Drawing Sheets

FIG.10 ly; in the second one, the wheel can only move in a direct course; in the third one, the wheel is immobile.

WHEEL STRUCTURE WITH A CENTRAL CONTROL

BACKGROUND OF THE INVENTION

1. Field of the Invention

The present invention relates to a wheel with a central control, more particularly one, which has a relatively simple structure, and which includes a central controlling shaft operable to change the wheel into first, second, and third configurations; in the first configuration, the wheel can move and turn left and right; in the second one, the wheel can only move in a direct course; in the third one, the wheel is immobile.

2. Brief Description of the Prior Art

Hospital beds are usually equipped with wheels so that they can serve substantially the same purpose as wheelchairs to transfer patients rapidly and easily from sick chambers to other divisions of a hospital such as examination rooms.

A currently existing wheel for use with hospital beds/wheelchairs includes a holding member, a brake, a brake controlling unit, two wheel members, a pivotal member, and a fastening plate; the holding member includes a covering part, and has a hole; the pivotal member is securely joined to the holding member by means of a connecting rib; the wheel members pivot on the pivotal member; the brake controlling unit is inserted in the hole of the holding member, and includes a bottom rubbing surface, and at least one protruding tooth portion; the fastening plate is disposed under the hole of the holding member, and has a gap thereon; the brake includes two lateral wing portions, a pressured side, and two supporting arms, which are pivoted to the connecting rib at one end thereof. The protruding tooth portion of the brake controlling unit will face the gap of the fastening plate when the holding member faces in a forward direction. Furthermore, the wheel members will be movable only in a direct course when the protruding tooth portion of the brake controlling unit is detained in the gap of the fastening plate. And, the lateral wing portions of the brake will be pressed against the wheel members so as to prevent the wheel members from rotating when the brake controlling unit is operated to exert pressure on the brake.

The above wheel has the following drawbacks: it has a relatively complicate structure, and it takes much time and labor to assemble, and is prone to shake.

SUMMARY OF THE INVENTION

It is a main object of the present invention to provide an improvement on a wheel structure to overcome the above problem.

A wheel structure according to an embodiment of the present invention includes a central sleeve, a central controlling shaft joined to the central shaft, a wheel pivoting on an extension portion of the central shaft, and a braking unit. The central controlling shaft includes a movable controlling piece. The central sleeve has a position-limiting element secured therein, which is arranged next to the controlling piece, and which has a position-limiting hole having the same outline as the controlling piece. The braking unit is arranged in the central sleeve in a movable manner, and biased upwards by springs. The central controlling shaft is operable to change the wheel into first, second, and third configurations; in the first configuration, the wheel can move and turn left and right

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
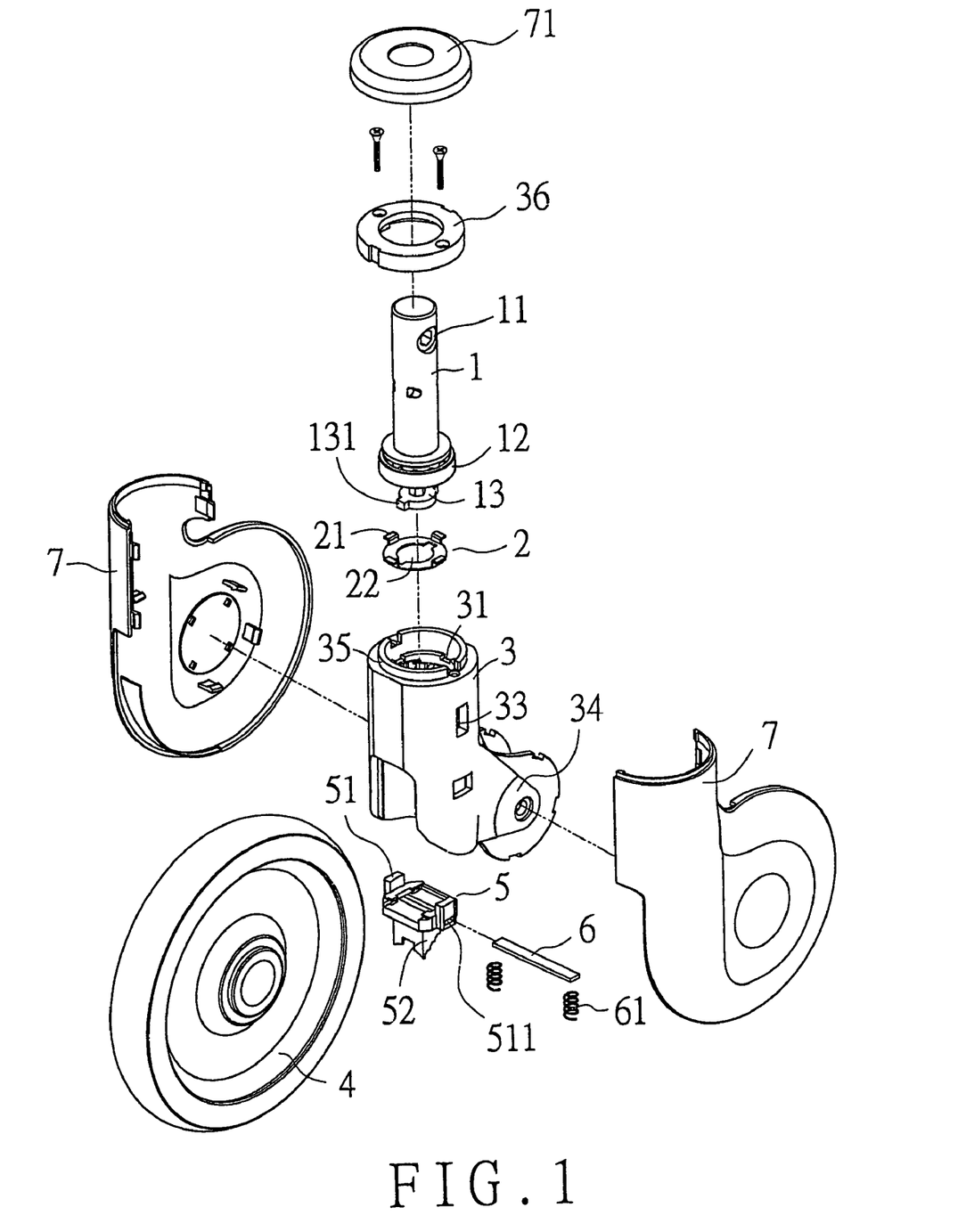
FIG. 1 is an exploded perspective view of the present invention.
Figure 2:
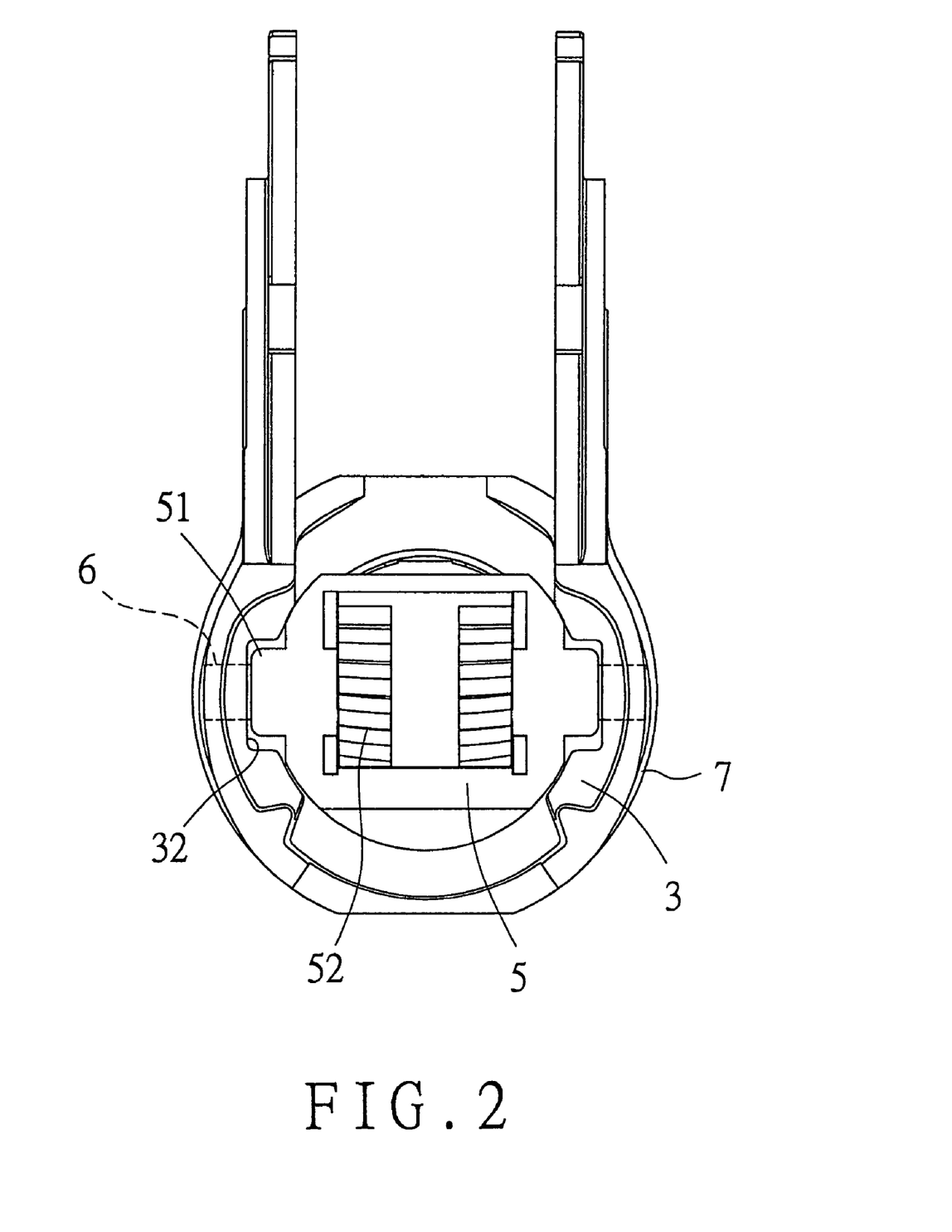
FIG. 2 is a bottom view of the present invention.

Referring to FIG. 1, a preferred embodiment of a wheel structure of the present invention includes:

a central controlling shaft 1, the central controlling shaft 1 has at one end thereof a connecting part 11 for controlling the central controlling shaft 1; the central controlling shaft 1 has a controlling piece 13 at the other end, which can be moved up and down to one of several different positions by means of turning the connecting part 11, which positions includes an upper position, a lower position, and an intermediate position between the upper and the lower ones; the controlling piece 13 has two protrusions 131 sticking outwards from two edge portions thereof that face in opposite directions;

a bearing 12 on the central controlling shaft 1;

a position-limiting element 2, which has a position-limiting hole 22 on a middle, and several detainment protrusions 21 on an outward edge thereof; the position-limiting hole 22 has the same outline as the controlling piece 13 of the central controlling shaft 1;

a central sleeve 3, the bearing 12 together with a lower end of the central controlling shaft 1 are received in the central sleeve 3 so that the bearing 12 is tightly pressed against the position-limiting element 2 to be firmly held in position; the central sleeve 3 has several grooves 31 on an inner side thereof, and the position-limiting element 2 is securely held in the central sleeve 3 with the detainment protrusions 21 being received in the grooves 31; the central sleeve 3 has two opposing rails 32 on the inner side, and has two opposing slots 33, which are formed on the rails 32 respectively; the central sleeve 3 has two extension portions 34 for a wheel to pivot on, as shown in FIGS. 1 and 2; the central sleeve 3 further has an uppermost portion 35 with several gaps, and has a top cap 36, which is firmly positioned over the uppermost portion 35, and partly inserted in the gaps of the uppermost portion 35 so as to make the bearing 12 firmly held in the central sleeve 3;

a wheel 4 pivoting on the extension portions 34 of the central sleeve 3;

a braking unit 5 received in the central sleeve 3 in an up and down movable manner, the braking unit 5 includes sliding block portions 51 on two sides thereof, which rest on the rails 32 of the inner side of the central sleeve 3 respectively; the braking unit 5 has a passage 511, which extends through both the sliding block portions 51; the braking unit 5 further has a ragged braking piece 52 on a bottom thereof, which faces the wheel 4 at the ragged side;

a pressing plate 6 passing through the opposing slots 33 of the central sleeve 3 as well as the passage 511 of the braking unit 5; the pressing plate 6 is biased upwards by means of elastic elements 61, which are positioned in the slots 33 and under the pressing plate 61; and a shell 7 covering the central sleeve 3 and the wheel 4; the shell 7 includes an outer covering 71, which is arranged on an upper end of the shell 7 to be on the top cap 36 of the central sleeve 3.

Figure 3:
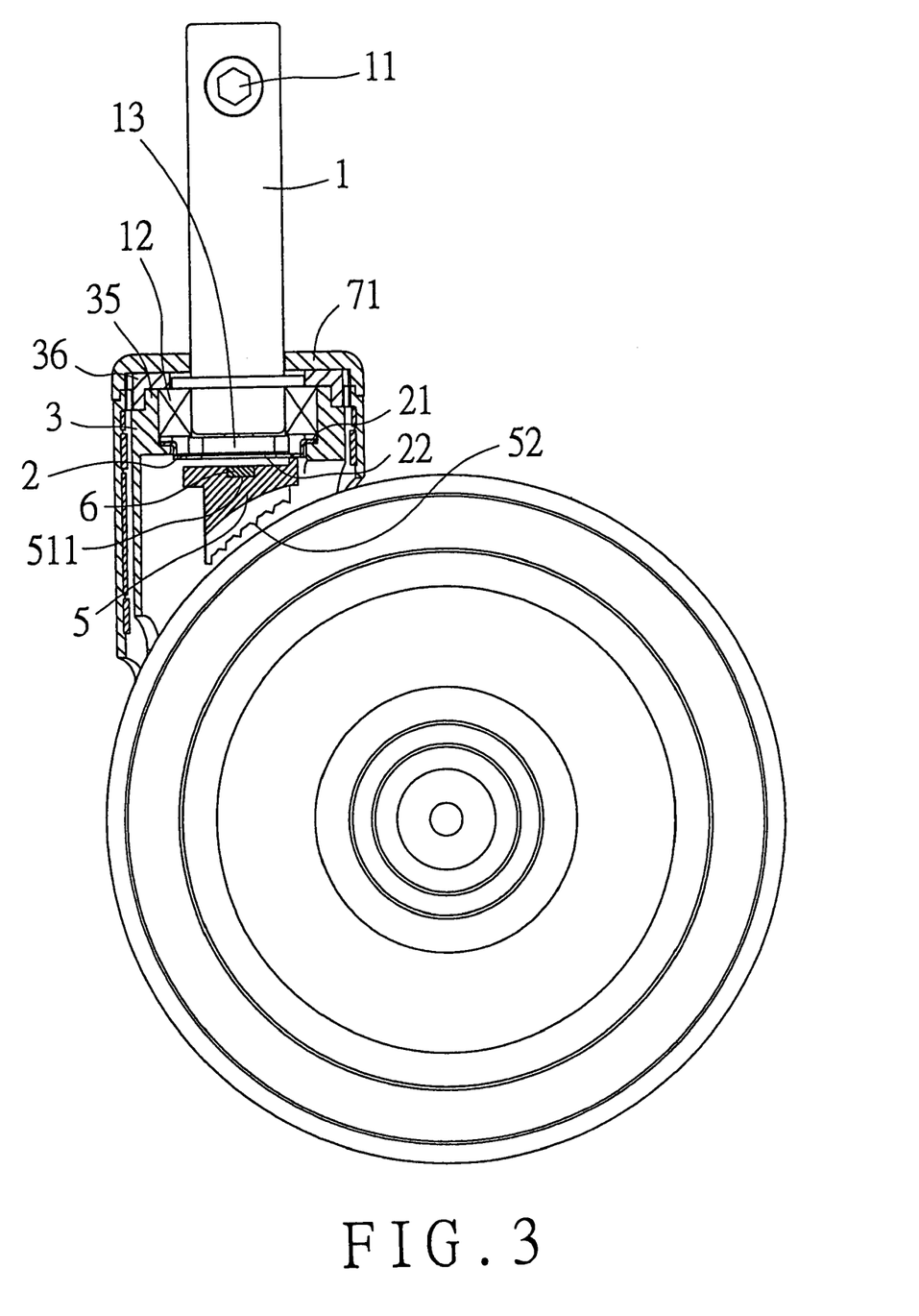
FIG. 3 is a sectional view of the present invention.
Figure 4:
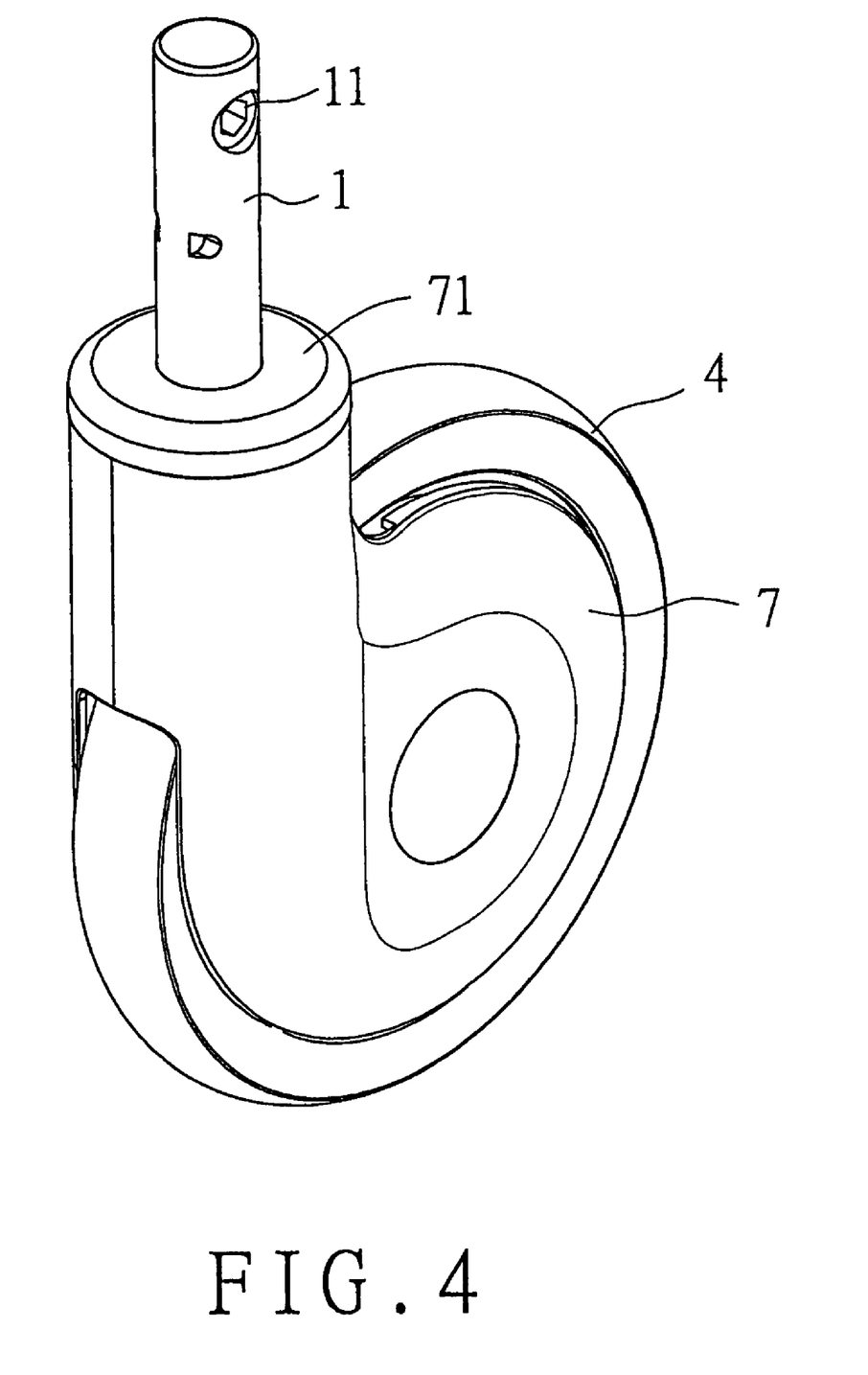
FIG. 4 is a perspective of the present invention.

In assembly, referring to FIG. 1 to FIG. 3, first the braking unit 5 is positioned in the central sleeve 3 with the sliding block portions 51 being received in the rails 32 respectively. Next, the pressing plate 6 is inserted in the slots 33 of the central sleeve 3 and the passage 511 of the braking unit 5, and the elastic elements 61 are positioned in the slots 33 to prop the pressing plate 6. Third, the position-limiting element 2 is positioned in the central sleeve 3 with the detainment protrusions 21 being received in the grooves 31 of the inner side of the central sleeve 3 respectively. Fourth, the central controlling shaft 1 is inserted in the central sleeve 3 with the bearing 12 resting on the position-limiting element 2. Fifth, the top cap 36 is secured over the uppermost portion 35 of the central sleeve 3 to press the bearing 12 against the position-limiting element 2. Finally, the shell 7 is secured over the central sleeve 3, with the outer covering 71 being securely positioned over the top cap 36 of the central sleeve 3 as shown in FIG. 4, so as to confine the elastic elements 61 and protect the whole structure.

The wheel of the present invention is usually in a first configuration to be capable of moving and turning left and right with the central sleeve 3 pivoting on the central controlling shaft 1, as shown in FIG. 3, wherein the controlling piece 13 is outside the position-limiting hole 22 of the position-limiting element 2.

Figure 5:
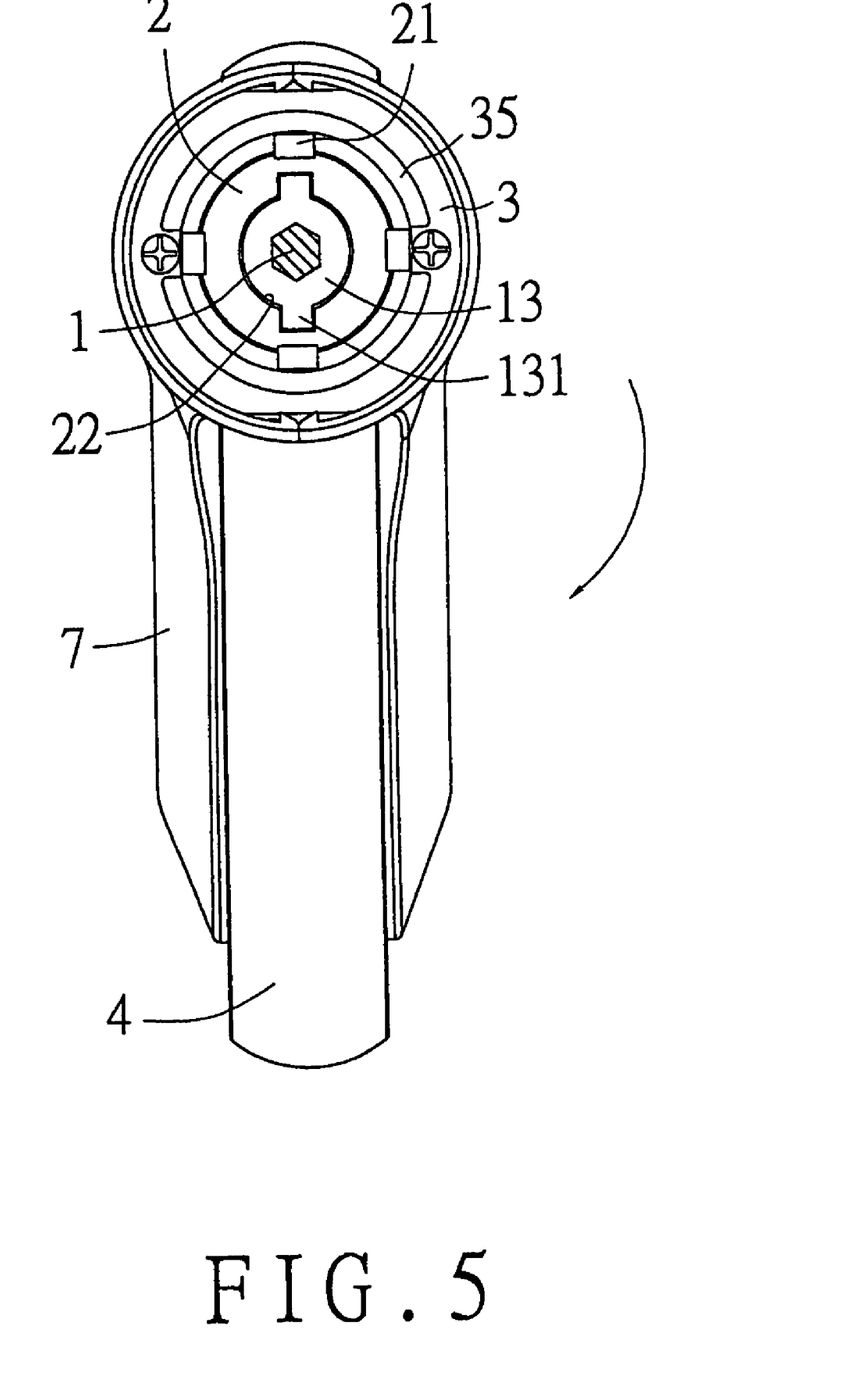
FIG. 5 is a top view of the present invention.
Figure 6:
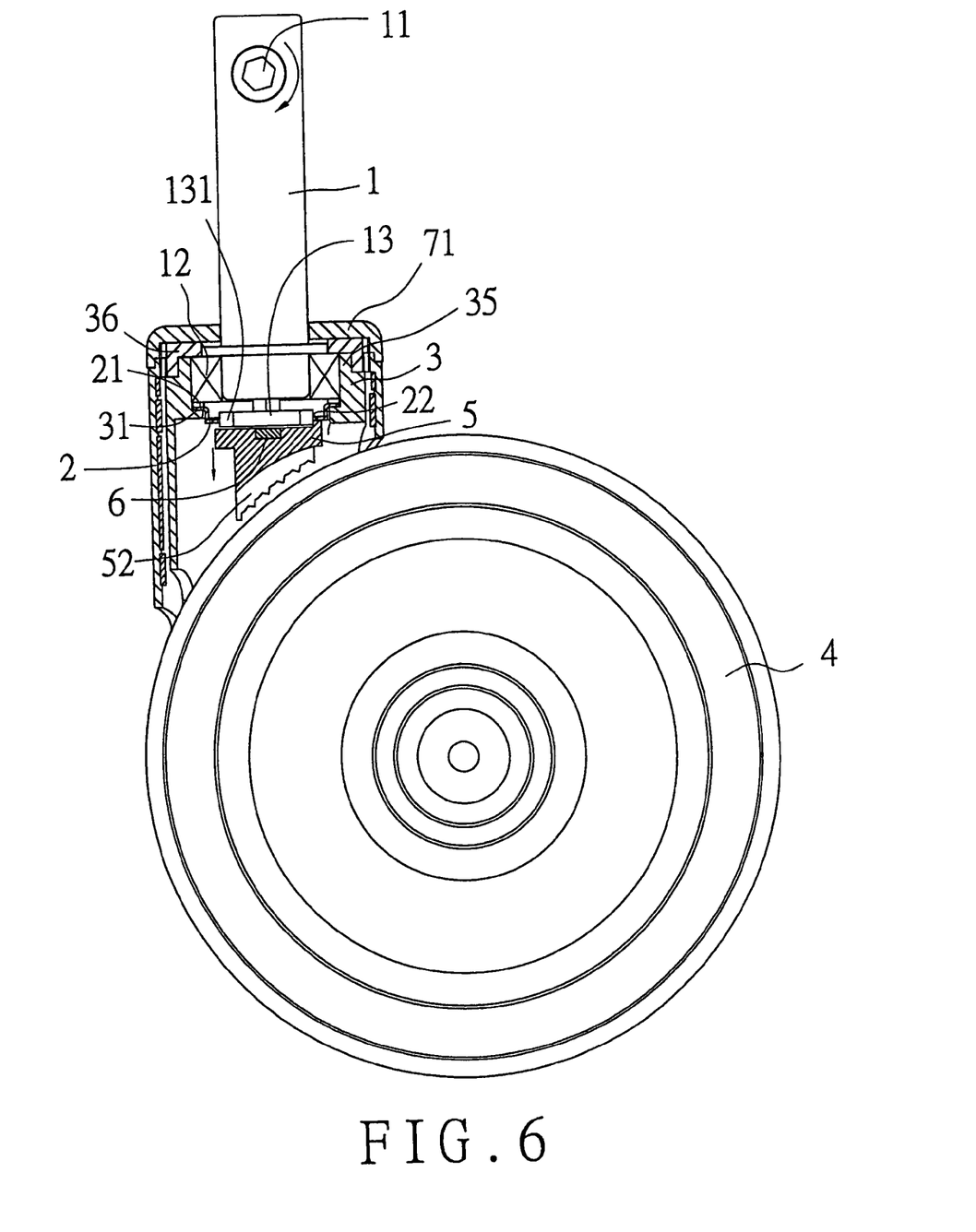
FIG. 6 is a sectional view of the present invention operating in a first configuration.
Figure 7:
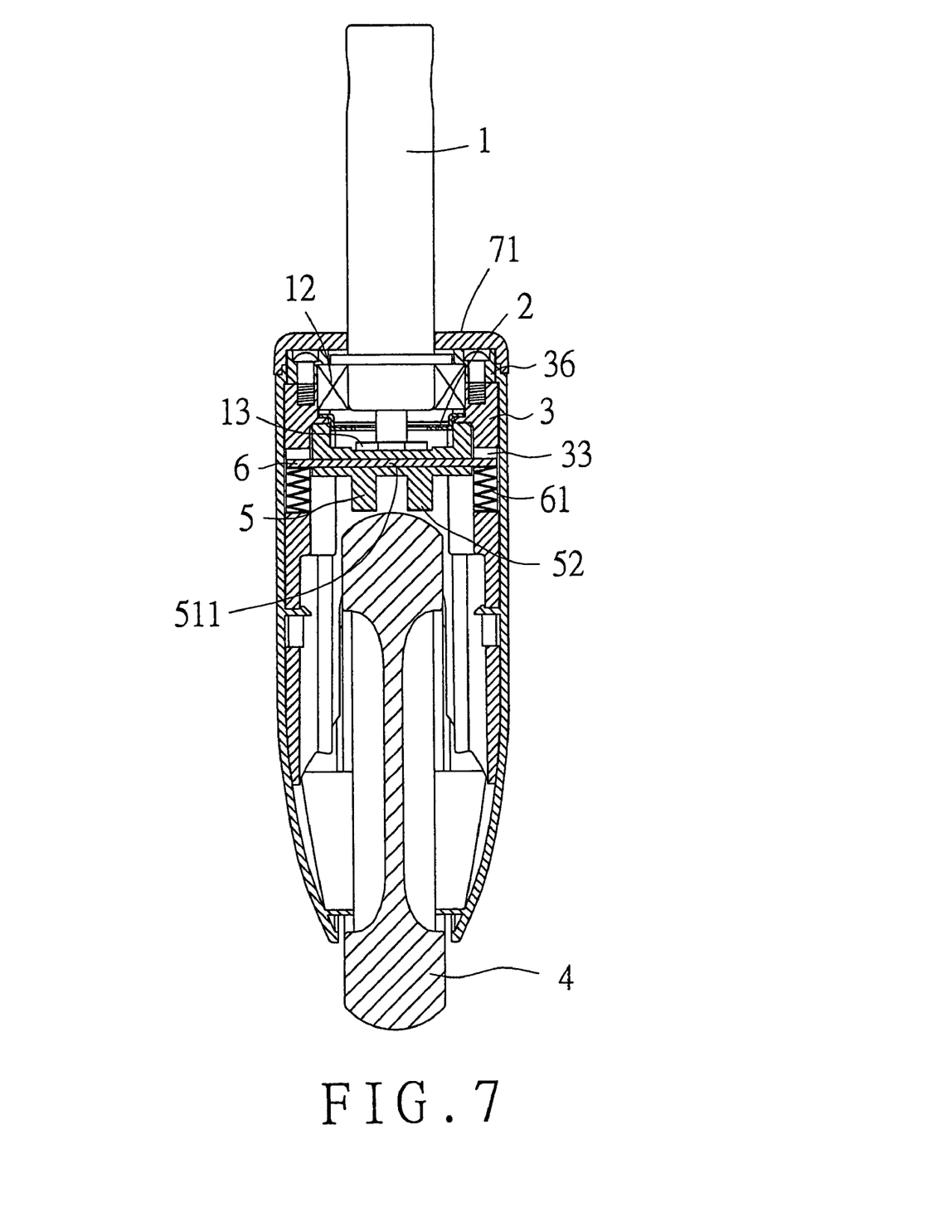
FIG. 7 is another sectional view of the present invention operating in the first configuration.

Referring to FIG. 5 to FIG. 7, the wheel of the present invention is adjusted to a second configuration so as to be only movable forwards and rearwards in a direct course, in which second configuration the controlling piece 13 will fit in the position-limiting hole 22 of the position-limiting element 2 to fix the central sleeve 3 to the central controlling shaft 1; in order to adjust the wheel to the second configuration, first the central sleeve 3 is turned so as to make the wheel to face forwards, and next the connecting part 11 of the central controlling shaft 1 is turned to move the controlling piece 13 downwards into the position-limiting hole 22 of the position-limiting element 2. Consequently, the vehicle equipped with the wheel can only move forwards/rearwards in a direct course.

Figure 8:
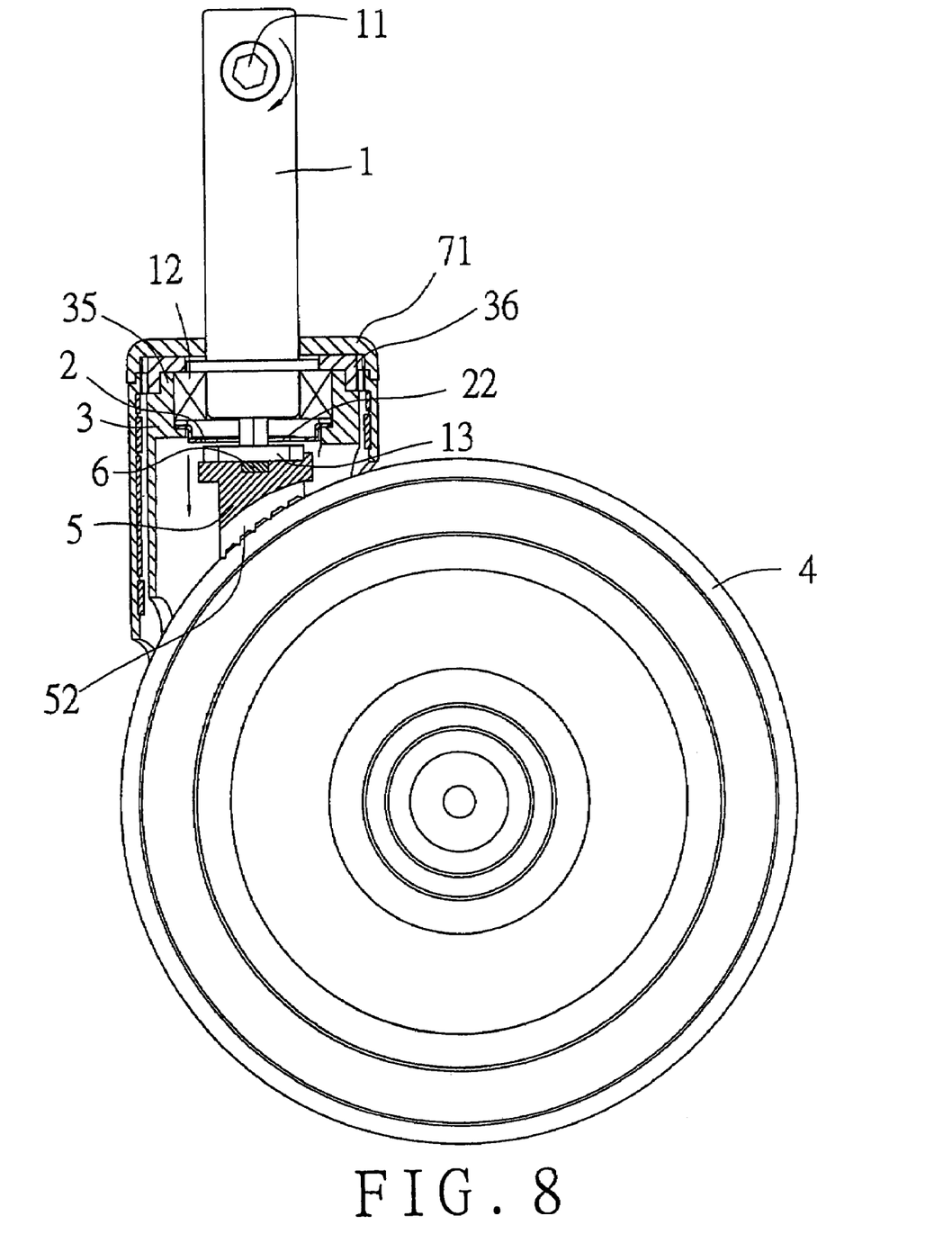
FIG. 8 is a sectional view of the present invention operating in a second configuration.
Figure 9:
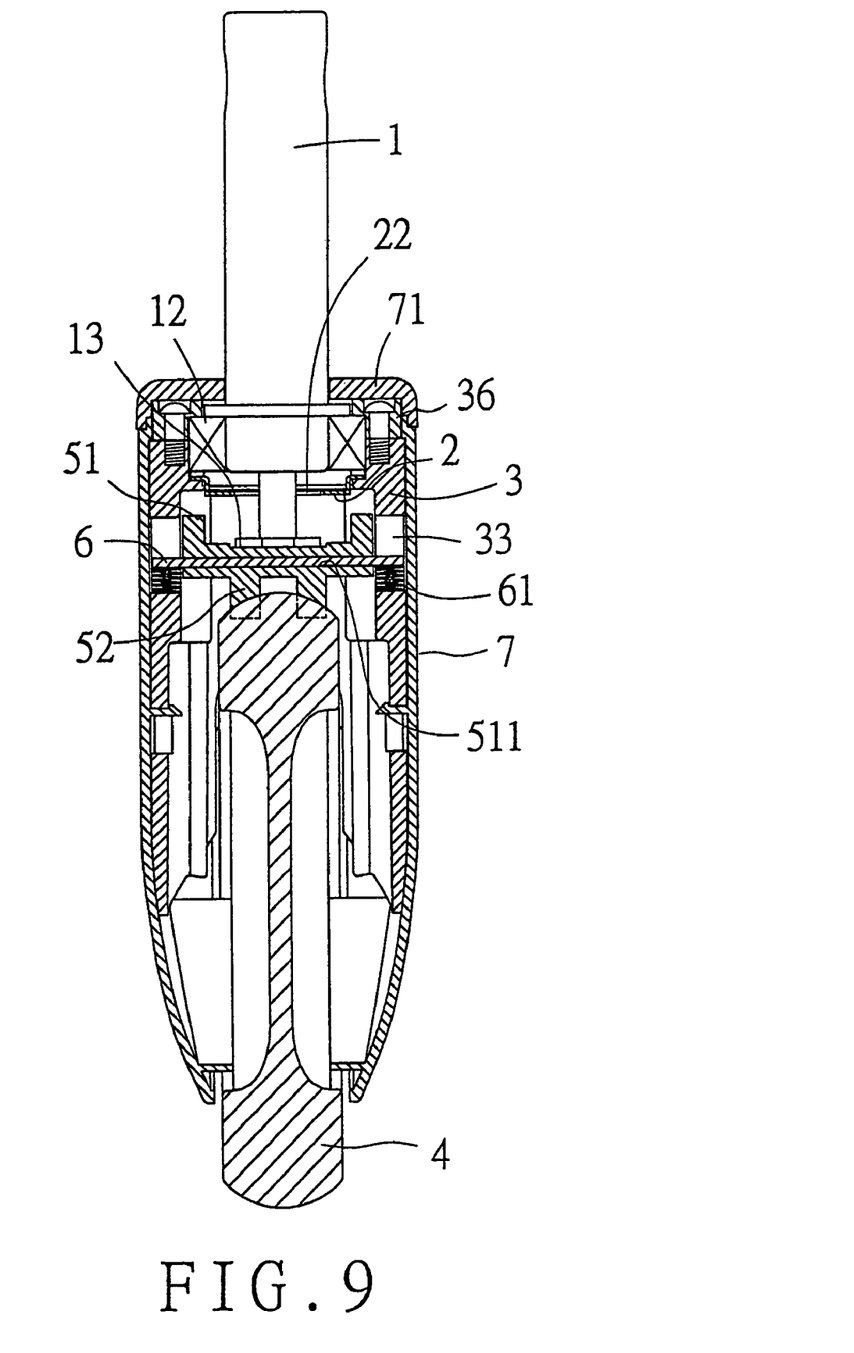
FIG. 9 is another sectional view of the present invention operating in the second configuration.

Referring to FIGS. 8 and 9, the wheel of the present invention is adjusted to a braked configuration to be immobile, wherein the braking unit 5 is in contact with the wheel 4 at the ragged braking piece 52 thereof; in order to adjust the wheel to the braked configuration, first the central sleeve 3 is turned so as to make the wheel to face forwards, and next the connecting part 11 of the central controlling shaft 1 is turned to move the controlling piece 13 downwards through the position-limiting hole 22 of the position-limiting element 2 such that the pressing plate 6 together with the braking unit 5 are depressed by the controlling piece 13. Consequently, the vehicle equipped with the wheel can't be moved.

The elastic elements 61 will bias both the pressing plate 6 and the braking unit 5 upwards away from the wheel 4, as shown in FIG. 3, as soon as the connecting part 11 of the central controlling shaft 1 is turned in the reverse direction so as to lift the controlling piece 13.

Figure 10:
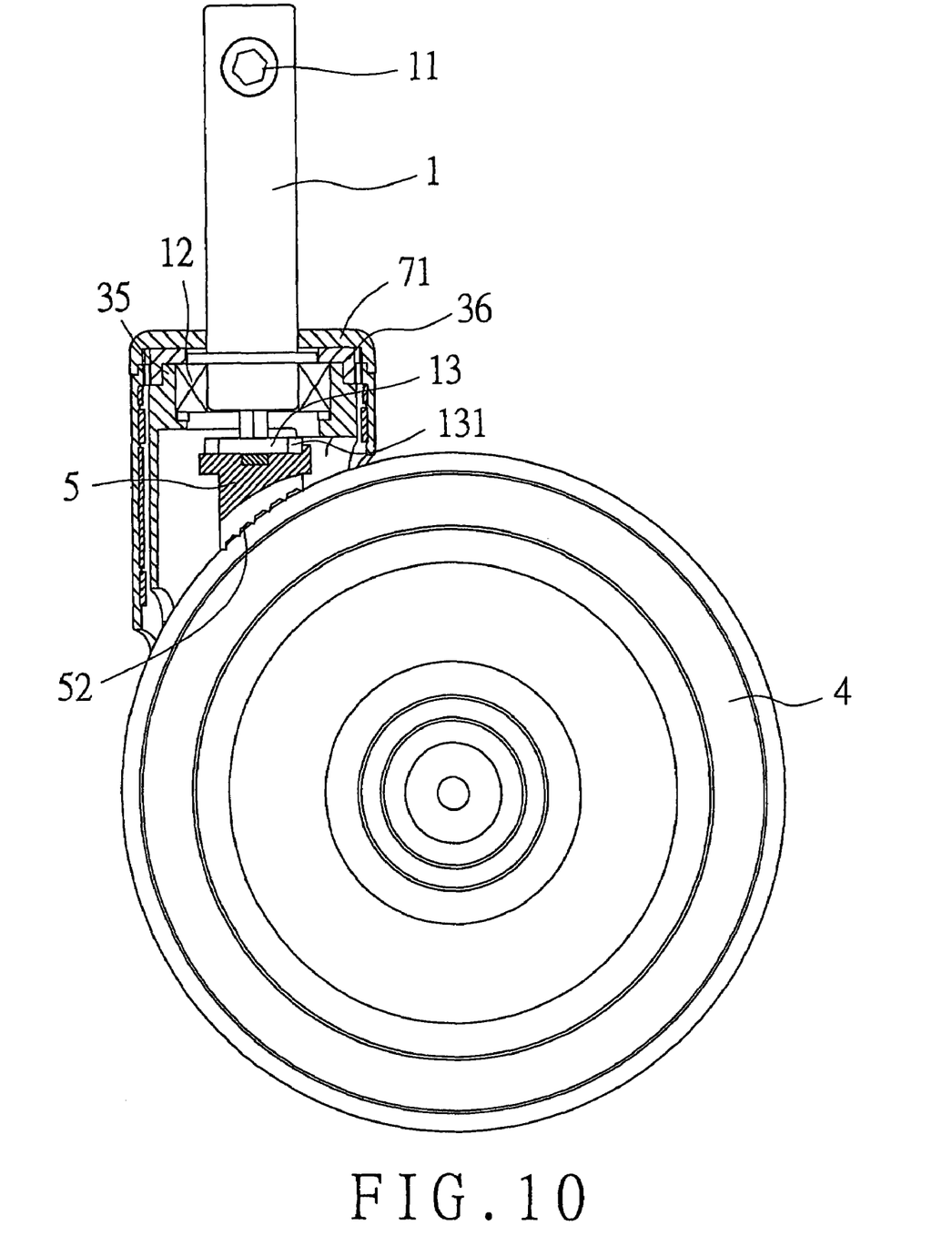
FIG. 10 is a sectional view of a second embodiment of the present invention.

Shown in FIG. 10 is a second embodiment of a wheel of the present invention. The second embodiment has the same structure as the first embodiment basically, yet it doesn't include the position-limiting element 2. Therefore, the wheel can only be changed between a movable configuration and an immobile one, wherein the controlling piece 13 will depress the braking unit 5 so as to make the braking unit 5 tightly pressed against the wheel 4.

From the above description, it can be seen that the wheel structure of the present invention has the following advantages over the prior art:

1. The present invention is controlled by means of the central controlling shaft, which occupies relatively little space. And, the present invention has a relatively simple structure, and can be changed into such a configuration as to be only movable forwards/rearwards in a direct course besides being changed into an ordinary movable configuration and an immobile (braked) one. Therefore, the present invention is more convenient to use.

2. The present invention includes the pressing plate and the elastic elements to help the braking unit to move between the braking position and the non-working position.

3. The central sleeve of the present invention has the uppermost portion, which is formed with several gaps, and over which the top cap is secured. Therefore, the bearing is firmly held in the central sleeve, and tightly pressed against the position-limiting element.

4. The shell of the present invention includes an outer covering secured over the top cap of the central shaft. Therefore, various inner parts of the wheel are firm.

What is claimed is:

1. A wheel structure with a central control, comprising
a central controlling shaft, the central controlling shaft having at a first end thereof a connecting part for controlling the central controlling shaft; the central controlling shaft having a controlling piece at a second end thereof; the controlling piece having two protrusions sticking outwards from two edge portions thereof;

a bearing on the central controlling shaft;

a central sleeve joined to the central controlling shaft; the central sleeve having a plurality of grooves on an inner side thereof; the central sleeve having two opposing rails on an inner side thereof; the central sleeve having two opposing slots, which are formed on the rails respectively; the central sleeve having two extension portions;

a wheel member pivoting on the extension portions of the central sleeve;

a position-limiting element secured inside the central sleeve, next to the controlling piece of the central controlling shaft; the position-limiting element having a middle position-limiting hole having a same outline as the controlling piece; the position-limiting element having a plurality of detainment protrusions, which are received in the grooves of the central sleeve;

a braking unit received in the central sleeve, the braking unit includes two sliding block portions, which rest on the rails of the inner side of the central sleeve respectively; the braking unit having a passage extending through both the sliding block portions thereof; the braking unit including a braking piece on a bottom thereof to face the wheel member;

a pressing plate passing through the opposing slots of the central sleeve as well as the passage of the braking unit;

the pressing plate being biased upwards by means of elastic elements positioned in the slots of the central sleeve; and a shell covering the central shaft and the wheel.

2. The wheel structure with a central control as claimed in claim 1, wherein the central sleeve has an uppermost portion formed with a plurality of gaps, and has a top cap tightly positioned over the uppermost portion.

3. The wheel structure with a central control as claimed in claim 1, wherein the shell includes an outer covering, which is securely arranged on an upper end of the shell.

4. The wheel structure with a central control as claimed in claim 1, wherein the braking piece of the braking unit has a ragged shape.

5. A wheel structure with a central control, comprising
a central controlling shaft, the central controlling shaft having at a first end thereof a connecting part for controlling the central controlling shaft; the central controlling shaft having a controlling piece at a second end thereof; the controlling piece having two protrusions sticking outwards from two edge portions thereof;
a bearing on the central controlling shaft;
a central sleeve joined to the central controlling shaft; the central sleeve having two opposing rails on an inner side thereof; the central sleeve having two opposing slots, which are formed on the rails respectively; the central sleeve having two extension portions;
a wheel member pivoting on the extension portions of the central sleeve;
a braking unit received in the central sleeve, the braking unit includes two sliding block portions, which rest on the rails of the inner side of the central sleeve respectively; the braking unit having a passage extending through both the sliding block portions thereof; the braking unit including a braking piece on a bottom thereof to face the wheel member;
a pressing plate passing through the opposing slots of the central sleeve as well as the passage of the braking unit; the pressing plate being biased upwards by means of elastic elements positioned in the slots of the central sleeve; and
a shell covering the central shaft and the wheel.

* * * * *